United States Patent
Hohmann, Jr.

(10) Patent No.: US 7,882,673 B1
(45) Date of Patent: Feb. 8, 2011

(54) SINGLE-PLY MASONRY FLASHING

(75) Inventor: Ronald P. Hohmann, Jr., Hauppauge, NY (US)

(73) Assignee: Mitek Holdings, Inc., Wilmington, DE (US)

( * ) Notice: Subject to any disclaimer, the term of this patent is extended or adjusted under 35 U.S.C. 154(b) by 652 days.

(21) Appl. No.: 11/437,494

(22) Filed: May 19, 2006

Related U.S. Application Data (63) Continuation-in-part of application No. 11/203,769, filed on Aug. 15, 2005, now Pat. No. 7,823,355, which is a continuation-in-part of application No. 10/427,050, filed on Apr. 30, 2003, now Pat. No. 6,928,780.

(51) Int. Cl.
   *E04C 1/40* (2006.01)

(52) U.S. Cl. .............................. 52/513; 52/61; 52/383; 52/302.6; 428/295.1; 156/40

(58) Field of Classification Search .................... 52/513, 52/61–62, 383, 302.1, 302.6; 428/295.1, 428/297.1, 297.4; 156/40
   See application file for complete search history.

(56) References Cited

U.S. PATENT DOCUMENTS

| | | | |
|---|---|---|---|
| 3,728,195 A | 4/1973 | Bolles | |
| 4,239,795 A | 12/1980 | Haage et al. | |
| 4,295,911 A | 10/1981 | Haage et al. | |
| 4,396,665 A | 8/1983 | Rowe | |
| 4,657,958 A * | 4/1987 | Fieldhouse et al. | 524/247 |
| 4,686,803 A | 8/1987 | Couderc et al. | |
| 4,755,409 A | 7/1988 | Harkness | |
| 4,762,744 A | 8/1988 | Woiceshyn et al. | |
| 4,775,567 A | 10/1988 | Harkness | |
| 4,910,931 A | 3/1990 | Pardue | |
| 5,106,447 A * | 4/1992 | Di Rado et al. | 156/334 |
| 5,230,189 A | 7/1993 | Sourlis | |
| 5,343,661 A | 9/1994 | Sourlis | |
| 5,634,310 A | 6/1997 | Hohmann | |
| 5,860,259 A | 1/1999 | Laska | |
| 5,870,864 A | 2/1999 | Snyder | |
| 5,937,594 A | 8/1999 | Sourlis | |

(Continued)

OTHER PUBLICATIONS

Fiberweb Flashing and Vapor Barrier Systems, Copper Aquaflash, specification sheet, (publication date unknown), 2pp.

(Continued)

*Primary Examiner*—Richard E Chilcot, Jr.
*Assistant Examiner*—Chi Nguyen
(74) *Attorney, Agent, or Firm*—Siegmar Silber, Esq.

(57) ABSTRACT

A masonry flashing is disclosed having a polymeric membrane and a pressure-activated adhesive in a peel-and-stick product. The flashing is used in cavity walls, typically a wall with an inner wythe of masonry block and an outer wythe of brick. The adhesive layer is a hot melt with various additives, which additives provide reinforcement to the flashing structure. The reinforcement can be fiber glass or filamentous fragments of polypropylene that are admixed into the adhesive. The flashing has a release sheet and, after removal thereof, the adhesive is pressed against the rough surface of the masonry block creating a durable bond with the inner wythe. Incorporated into the masonry flashing are various high-strength, polymeric webs including a spun-bonded polyolefin, an ethylene propylene diene terpolymer, and a polyvinylchloride with an ethylene interpolymer.

14 Claims, 4 Drawing Sheets

U.S. PATENT DOCUMENTS

| | | | |
|---|---|---|---|
| 6,023,892 A | 2/2000 | Sourlis | |
| 6,035,582 A | 3/2000 | Pacific | |
| RE36,676 E | 5/2000 | Sourlis | |
| 6,167,660 B1 | 1/2001 | Sama | |
| 6,224,700 B1 * | 5/2001 | Oakley | 156/71 |
| 6,584,746 B1 * | 7/2003 | Hohmann et al. | 52/513 |
| 6,912,820 B2 * | 7/2005 | Sourlis | 52/302.1 |
| 6,928,780 B1 * | 8/2005 | Hohmann et al. | 52/513 |
| 6,945,000 B1 * | 9/2005 | Hohmann et al. | 52/513 |
| 6,964,136 B2 * | 11/2005 | Collins et al. | 52/209 |
| 7,216,460 B2 * | 5/2007 | Sourlis | 52/169.5 |
| 7,448,175 B2 * | 11/2008 | Sourlis | 52/302.1 |
| 7,488,523 B1 * | 2/2009 | Muncaster et al. | 428/40.1 |
| 7,603,816 B1 | 10/2009 | Hohmann, Jr. | |

OTHER PUBLICATIONS

Sandell Mfg. Co, Inc., Rubber-Seal Flashing, Product Catalogue Sheet (Schenectady, NY, publication date unknown), 4 pp.
Firestone, FlashGard, Product Specification Sheet (publication date unknown), 2 pp.
Hohmann & Barnard, Inc., Product Catalog (Hauppage, NY, 2002), pp. 18-20.
Dur-O-Wal, Inc., Product Catalog (Aurora, II, 2000), p. 14.
Wire Bond Corp., Product Catalog (Charlotte, NC, 2002/2003), pp. 18-19.
Hyload, Inc., Product Catalog (Wadsworth, OH, 1996).
York Mfg, Inc., Product Catalog (Sanford, ME, undated).
Advanced Bldg Products, Inc., (Springdale, ME, undated).
Sandell Mfg Co., Inc., (Schenectady, NY, undated).

* cited by examiner

SINGLE-PLY MASONRY FLASHING

RELATED APPLICATION

This application is a continuation-in-part of a patent application entitled Nonmetallic Masonry Flashing bearing application Ser. No. 11/203,769 and filed Aug. 15, 2005, which in turn, was a continuation-in-part of a patent application entitled Metal Foil/Scrim Flashings, bearing Ser. No. 10/427,050, filed Apr. 30, 2003, now U.S. Pat. No. 6,928,780 issued Aug. 16, 2005.

BACKGROUND OF THE INVENTION

1. Field of the Invention

This invention relates to an improved flashing system for cavity wall structures, and more specifically to peel-and-stick masonry flashings and more particularly to polymeric flashings utilizing a variety of adhesives with optional fire retardant. Additionally, one embodiment includes a border edge or selvage incorporating a metal or plastic foil lamina as a drip edge.

2. Description of the Prior Art

In the past, investigations relating to cavity wall flashing systems for brick veneer masonry construction have been conducted. While strides have been made in flashing-related technologies, including metal foils, polymeric and elastomeric materials and hot melt adhesives, there still remain several areas where continued development is ongoing.

The inventors' patents and their assignee's product line are all related to accessories for cavity wall structures and include insulation, and anchoring and seismic devices, and are sold under the trademarks of Seismiclip®, Byna-Tie®, and DW-10-X®. These products, which are manufactured by Hohmann & Barnard, Inc., Hauppauge, N.Y. 11788, have become widely accepted in the construction industry and have provided the inventors with particular insight into the technological needs of this marketplace.

Masonry walls with brick veneer are designed with an inner and an outer wythe and a cavity therebetween. The masonry block inner wythe and insulation thereon isolates the interior of the building from the environment, while the brick veneer outer wythe provides an aesthetic finish to the building and a system of weep holes for water removal. The inner wythe of a building is constructed to exclude water and water vapor from the interior. Since the presence of excessive levels of water or water vapor in the cavity hastens the deterioration of building materials, various masonry flashing systems have been adopted to function cooperatively with the system of weep holes.

Because of widespread usage and familiarity with bituminous and asphaltic products in roofing applications, when masonry flashing systems were first designed, the building construction industry adopted the familiar copper and asphalt products. At that time the technology of pressure-sensitive hot melt adhesives needed for peel-and-stick applications was insufficiently developed. Some critics indicated that the tackiness of the non-asphaltic products was insufficient for the rough masonry block surfaces. Because of the presence of plasticizers, others were apprehensive about the available hot melt adhesives meeting the requisite fire retardancy standards. Also, to provide fire retardancy, some pressure-sensitive products were marketed for building construction use with inorganic fillers, such as alumina trihydrate, antimony oxide or calcium carbonate. However, these filled pressure-sensitive products had disadvantages, such as application problems, phase separation, toxicity, and reduced adhesion upon activation.

Prefabricated peel-and-stick flashing materials have been proposed, such as those shown in Harkness, U.S. Pat. No. 4,775,567 (see infra). These materials have included layers of bitumen and of compound bitumen for adhering the materials to the exteriors of masonry walls. While, under ideal circumstances, these peel-and-stick materials were easy to apply, the patent literature indicates that these materials did not conform well to irregular surfaces. Thus, the prior art bitumens used to secure these flashing materials to masonry walls often lacked the tackiness to bond tightly and durably to the wall surfaces. On occasion, when ambient temperatures were high, the bituminous materials drooled marring the aesthetics of the brick veneer.

In the past, the previously mentioned assignee hereof has distributed, under the Copper Aqua Flash membrane name, a line of composite flexible flashings. The composite, in one form thereof, is 50 mil. thick and consists of a 3-ounce, solid sheet of annealed copper laminated on one side to a polyester film and bonded on the other with a highly adhesive SBS modified bitumen (rubberized asphalt) with a peel-and-stick silicone top sheet. By completely encapsulating the copper in the polyester film on one side and rubberized asphalt on the other, the copper is protected from corrosion by alkaline or acidic solutions. Although the rubberized asphalt virtually eliminated the possibility of non-adhered areas, the Copper Aqua Flash membrane still had some of the previously described disadvantages of a bitumen-based flashing system.

Despite these early efforts, developing the right combination of materials and methods for flashing cavity walls in a fast and efficient manner has proved elusive. In addition to the above described technical problems, because there is frequently a delay between erecting the inner wythe and the outer wythe, the flashing installed on the inner wythe is often exposed to substantial ultra-violet radiation. Thus, standards similar to ASTM Specification G154 need to be met by masonry flashing systems.

As flashing for cavity walls involves numerous technological considerations, including, but not limited to, tensile strength, puncture- and tear-resistance, UV exposure, water absorption, pliability, peel and lap adhesion, and flammability, various industry standards under ASTM have arisen which serve as a guide to flashing manufacturers, architectural engineers, and others preparing and meeting construction specifications. Among the relevant ASTM standards are ASTM D 624, Standard test method for tear strength of . . . thermoplastic elastomers; ASTM D 412, Standard test method for . . . thermoplastic elastomers—tension; ASTM D 2240, Standard test method for rubber property—durometer hardness (applies to thermoplastic elastomers); and, ASTM G 154, Standard practice for operating fluorescent light apparatus for UV exposure of nonmetallic materials.

The inventors hereof have in the related inventions cited hereinabove made strides towards resolving some of the problems just described. Hohmann et al., U.S. Pat. Nos. 6,584,746, issued Jul. 1, 2003, 6,928,780, issued Aug. 16, 2005; and, 6,945,000, issued Sep. 10, 2005 provide masonry flashing systems which are suitable either for surface-mounting with a termination bar or for through-wall mounting. The device used state-of-the-art clear hot melt adhesives and a reinforced elastomeric composite.

In preparing for this application the following patents came to the attention of the inventors and are believed to be relevant to the further discussion of the prior art:

| U.S. Pat. No. | Inventor | Issue Date |
| --- | --- | --- |
| 6,945,000 | Hohmann et al. | Sep. 20, 2005 |
| 6,928,780 | Hohmann et al. | Aug. 16, 2005 |
| 6,584,746 | Hohmann et al. | Jul. 1, 2003 |
| 6,224,700 | Oakley | May 1, 2001 |
| 6,035,582 | Pacific | Mar. 14, 2000 |
| 5,870,864 | Snyder | Feb. 16, 1999 |
| 5,860,259 | Laska | Jan. 19, 1999 |
| 4,910,931 | Pardue | Mar. 27, 1990 |
| 4,775,567 | Harkness | Oct. 4, 1988 |
| 4,755,409 | Harkness | Jul. 5, 1988 |
| 4,295,911 | Haage et al. | Oct. 20, 1981 |
| 4,239,795 | Haage et al. | Dec. 16, 1980 |

Oakley—U.S. Pat. No. 6,224,700—Issued May 1, 2001

Oakley in U.S. Pat. No. 6,224,700 (assigned to Mar-Flex Systems, Inc., Middletown, Ohio) describes a method of applying a composite material to an above-grade building component to form a tacky non-swelling elastomeric membrane. Thereafter, a flexible, non-porous polymeric sheet is pressed onto the tacky exterior of the elastomeric membrane. The polymeric sheet is stronger than the elastomeric membrane and protects the elastomeric membrane from punctures or tears. Here, in situ construction is both labor intensive and requires special equipment for installation.

Pacific—U.S. Pat. No. 6,035,582—Issued Mar. 14, 2000

Pacific describes a flashing material which includes a sheet layer of copper, aluminum or other metal or a thin sheet of unreinforced plastic. Here it appears that in situ adhesives are applied.

U.S. Pat. No. 5,870,864—Snyder—Issued Feb. 16, 1999

Snyder describes a drainage system employing water collection pans which for insertion into the interior cavities of masonry block units over the length of a selected block wall course for collecting the water drained through the interior cavities of the upper courses and directing water to the exterior of the wall.

U.S. Pat. No. 5,860,259—Laska—Issued Jan. 19, 1999

Laska describes an insulated drainage panel for use in cavity wall or veneer wall construction which panel includes a planar insulating board with a porous structure thereof.

U.S. Pat. No. 4,910,931—Pardue—Issued Mar. 27, 1990

In the Pardue patent, a water collection and drainage system is described for a masonry block wall having bond beam block courses and intervening standard block courses. A system of upper water collection pans is supported along each upper bond beam course. Downspouts leading from drain openings in the upper collection pans drain collected from the pans through the vertical block cavities in lower block courses to the next lower series of collection pans. Weeping spouts lead laterally from the base collection pans to the exterior of the wall to continuously drain collected water from the interior wall cavities.

U.S. Pat. Nos. 4,775,567 and 4,755,409—Harkness—Issued Oct. 4, 1988 and Jul. 5, 1988, Respectively.

A waterproofing laminate suitable for use in roofs, floors or other surfaces where waterproofing is desired contains a reinforcing sheet, first and second bitumen layers secured to opposite surfaces of the reinforcing sheet, first and second compound bitumen layers secured to the bitumen layers, an elastomeric sheet secured to the first compound bitumen layer and a release sheet secured to the second compound bitumen layer. Certain preferred materials for use in the laminate are recited.

U.S. Pat. Nos. 4,295,911 and 4,239,795—Haage et al.—Oct. 20, 1981 and Dec. 16, 1980, Respectively.

A protective covering for the protection of surface seals against mechanical damage in building constructions and other civil engineering constructions which comprises a composite of an elastic, waterproof thermoplastic synthetic resin film sheet and/or synthetic resin layer and a lattice-like fabric having knot couplings or points of intersection of the threads that yield under the effect of a load.

The masonry flashing system of this invention includes a selected group of polymeric membranes with clear, pressure-activated adhesive thereon, and a release sheet for peel-and-stick mounting in the cavity between the inner wythe and the outer wythe as described infra. Additionally, one embodiment hereof includes a metal foil drip edge, and, in another, the adhesive layer has been doped with fibrous material to increase the overall strength of the construct. The structure of this invention has been found to obviate the difficulties discussed above and provides other advantages as set forth herein.

SUMMARY

In general terms, the masonry flashing disclosed hereby includes a unique membrane and adhesive peel-and-stick combination. The flashing is particularly applicable to cavity walls such as a wall with an inner wythe of masonry block and an outer wythe or veneer of brick. The peel-and-stick flashing structure also includes an adhesive layer which is described hereinbelow as including a clear, pressure activated, hot melt adhesive and various additives. In some embodiments, the additive is selected for the purpose of providing reinforcement to the entire structure. To accomplish this, a fibrous component, such as fiber glass or filamentous fragments of polypropylene, are admixed into the hot melt adhesive. The masonry flashing hereof takes advantage of peel-and-stick technology and, after removal of a release sheet, the adhesive thereon is pressed against the rough surface of the masonry block. The pressure activation creates a durable bond with the inner wythe.

Incorporated into the masonry flashing are various high-strength, polymeric webs. These webs include a spun-bonded polyolefin, an ethylene propylene diene terpolymer, and a polyvinylchloride with an ethylene interpolymer.

The peel-and-stick technology shown herein enables quick and sure flashing of cavity walls which was unavailable prior to the advances in the materials of both polymeric membranes and hot melt adhesives. The detailed description of these materials is provided hereinbelow.

OBJECTS AND FEATURES OF THE INVENTION

It is an object of the present invention to provide, for cavity wall construction, a high-strength masonry flashing.

It is a further object of the present invention to provide for mounting on the exterior surface of the inner wythe a peel-and-stick polymeric membrane and to precoat the flashing with a pressure-activated, clear adhesive which, upon removal of a release sheet and application of pressure thereto, strongly adheres to the rough and porous surfaces of the masonry block and of the brick.

It is another object of the present invention to provide in a masonry flashing for cavity wall construction, combining clear hot melt adhesive and polymeric membrane technologies in a device free of bituminous or asphaltic coatings, which flashing resists drooling, tearing and puncturing.

It is yet another object of the present invention to provide a labor-saving masonry flashing which utilizes peel-and-stick components that are easy and economical to install in cavity wall constructs having a masonry block inner wythe and a brick outer wythe.

It is still yet another object of the present invention to provide a masonry flashing which has a built-in drip edge and operates cooperatively with present flashing accessories such as mortar guards and weep hole fittings.

It is a feature of the present invention that the hot melt adhesive hereof is compatible with high-strength flashing membranes hereof and meets industry flammability standards.

It is another feature of the present invention that the flashing membrane hereof is highly, ultraviolet resistant and the adhesive layer of the flashing enhances tear and puncture resistance of the overall structure.

It is yet another feature of the present invention that when the hot melt adhesive is doped with fibrous reinforcement, the bonding of the flashing with the inner wythe is strengthened and the overall device strength is enhanced.

It will become apparent that these aims and other objects and features are best achieved by a peel-and-stick masonry flashing for a cavity wall characterized in that it comprises:

a polymeric web having two major surfaces;

a hot melt adhesive layer disposed on a major surface of said polymeric web, said hot melt adhesive adapted by having sufficient tack to durably adhere to the surface of said masonry block, said hot melt adhesive consisting principally of a thermoplastic elastomer, a tackifier resin and an amorphous diluent in proportions upon pressure activation thereof to provide the required adhesion; and, a release sheet disposed atop said hot melt adhesive layer, said release sheet being removable prior to activation of said peel-and-stick flashing.

BRIEF DESCRIPTION OF THE DRAWINGS

In the following drawings, the same parts in the various views are afforded the same reference designators.

DESCRIPTION OF THE PREFERRED EMBODIMENTS

In the single-ply masonry flashing system of this invention, pressure-activated hot melt adhesives and adhesive blends are used to attach high-strength polymeric membranes to the cavity face of the masonry inner wythe and to the upper surface of a course of brick outer wythe. The masonry flashing is emplaced behind the insulation which, in turn, serves to protect against thermal losses, to reduce sound, and to prevent water vapor condensing on colder surfaces. In the embodiments shown, three different types of polymeric membranes are combined with different adhesive formulations. Each flashing is constructed to increase the life of the structure by enhancing the tensile strength and by improving tear and puncture resistance.

In the first embodiment a spun-bonded polyolefin web of flashing is combined with a pressure-activated adhesive and after peeling off a release sheet, is applied to the cavity wall. The pressure-activated adhesive is a hot melt adhesive consisting principally of a thermoplastic elastomer, a tackifier resin and an amorphous diluent. The proportions of the principal constituents are adjusted to provide sufficient tack to durably adhere to the surface of masonry block.

In this embodiment, the overall structure is strengthened by doping the adhesive layer with fibrous material such as fragments of polymeric fiber or fiber glass. In contradistinction to the related cases, the role of the adhesive hereof is changed in emphasis in theat optionally a structurally strengthening, fiber-doped adhesive is used. Such adhesives not only have sufficient tack to adhere to masonry block, but also have substantial reinforcement that adds to the strength of the overall assemblage.

Figure 1:
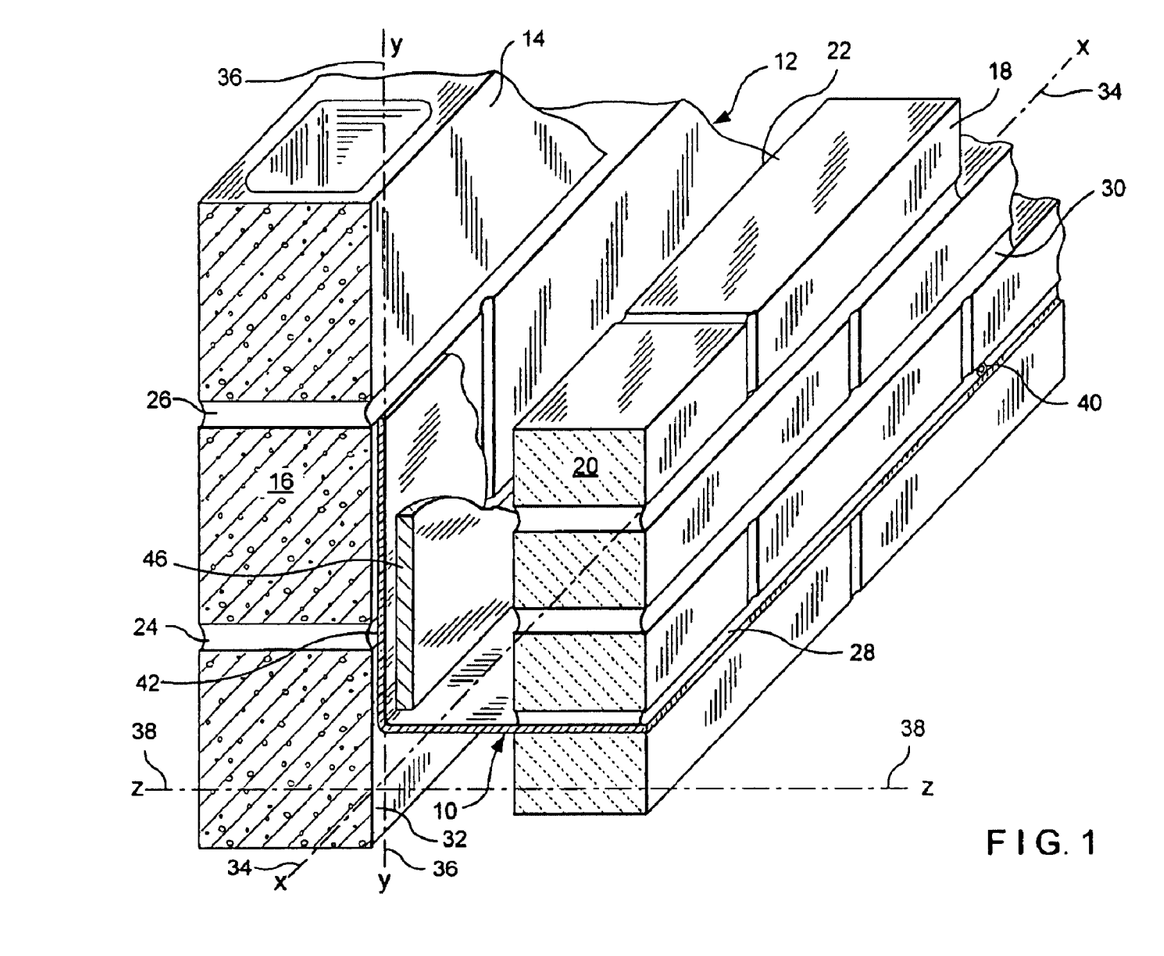
FIG. 1 is a perspective view of a first embodiment of a single-ply masonry flashing of this invention and shows a cavity wall with an interior wythe of masonry block and an exterior wythe of brick having a surface-mounted flashing membrane installed in the cavity thereof.
Figure 2:
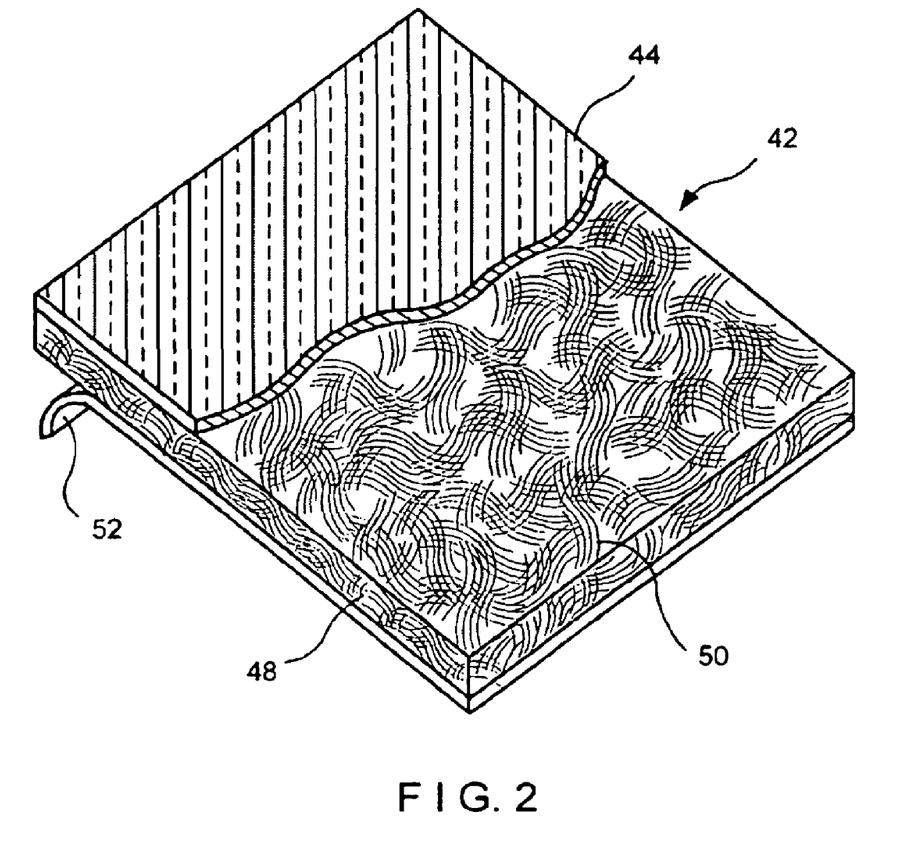
FIG. 2 is a perspective view of the uninstalled peel-and-stick flashing spun-bonded polyolefin membrane of FIG. 1 with a layer of pressure-activated clear adhesive and a release sheet partially broken away to show details of the structure thereof.
Figure 3:
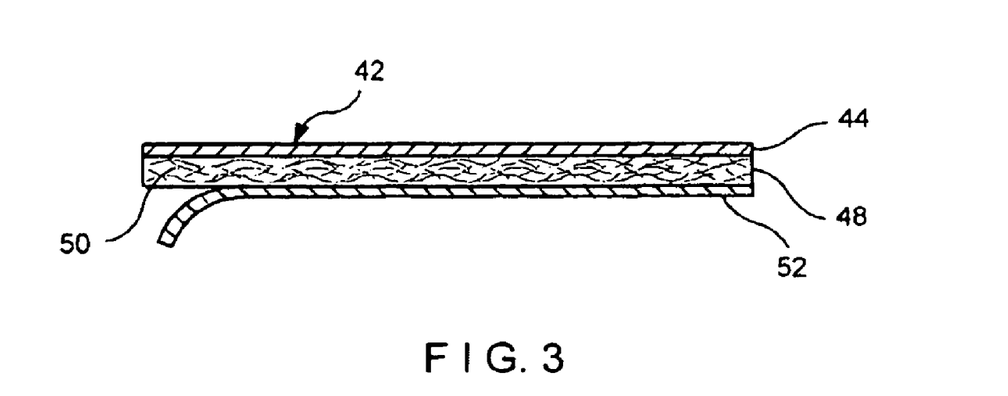
FIG. 3 is a cross-sectional view of the flashing membrane of FIG. 2.

Referring now to FIGS. 1 through 3, the first embodiment of this invention in which a single-ply flashing assembly or masonry flashing structure referred to generally by the reference designator 10 is shown. In this embodiment, a cavity wall structure 12 is shown having an inner wythe 14 of masonry blocks 16 and an outer wythe 18 of facing brick 20. Between the inner wythe 14 and the outer wythe 18, a cavity 22 is formed. Successive bed joints 24 and 26 are formed between courses of blocks 16 and the joints are substantially planar and horizontally disposed. Also, successive bed joints 28 and 30 are formed between courses of bricks 20 and the joints are substantially planar and horizontally disposed. For the surface-mounted flashing installation of this embodiment the flashing 10 is shown extending up to bed joint 26 of the inner wythe 14 and through bed joint 28 of the outer wythe 18.

For purposes of this discussion, the exterior surface 32 of the interior wythe 14 contains a horizontal line or x-axis 34 and an intersecting vertical line or y-axis 36. A horizontal line or z-axis 38 also passes through the coordinate origin formed by the intersecting x- and y-axes. A horizontal line or z-axis 38 also passes through the coordinate origin formed by the intersecting x- and y-axes. In the discussion which follows, it will be seen that the masonry flashing system 10 of this invention is constructed to completely seal the cavity, to drain water therefrom and to permit air and water vapor to enter and exit through weep holes 40 that are in communication with the single-ply masonry flashing 10.

Across the cavity 22, in this embodiment, a surface-mounting of the single-ply masonry flashing is shown. The flashing 10 includes a polymeric composite membrane 42 having the laminae machine direction disposed in the laminate so as to enhance the tear and tensile strength thereof. The flashing membrane 42 is constructed for emplacement on surface 32 of interior wythe 14 in an 2-y plane and for extending across cavity 22 into bed joint 28. The cavity 22, upon installation of the flashing, is sealed thereby. In this preferred mode, it is seen that the polymeric membrane 42 is installed behind insulation 46.

The flashing arrangement of the membrane 42 and the brick outer wythe 20, obviates the need for the customary drip plate. However, if desired one, preferably of stainless steel, may be employed or, as described hereinbelow, a combined masonry flashing with a built-in drip plate. Weep holes 40 permit any moisture or condensate to drain away from and out of the cavity 22 and permit air and water vapor to enter into and exit from the cavity.

While polymeric single-ply membrane 42 of this embodiment is spun-bonded polyolefin, the single-ply membrane may be formed from a suitable thermoplastic polymer, for example, homo- and co-polymers of ethylene, polyolefin, polypropylene, polystyrene, polyvinyl chloride, polyvinylidene chloride, polyvinyl alcohol, and ethylene/vinyl acetate copolymers. Of these the most preferred materials are polyolefin, polypropylene and high density polyethylene.

Referring now to FIGS. 2 and 3 the structure of the uninstalled peel-and-stick masonry flashing 42 is shown. The membrane 42, while being shown in FIG. 1 as a surface-mounted flashing, is suitable for either through-wall or surface mounting and utilizes the pressure-activated adhesive technology for application and extrusion lamination technology for construction. The structure consists of a three-layer arrangement. When viewing the uninstalled membrane 42 from the exposed surface and proceeding toward the mounted surface these layers are:

a. single-ply lamina 44—spun-bonded polyolefin;
 b. pressure-activated, hot-melt adhesive 48 that is fiber-doped with glass fibers 50; and,
 c. release sheet 52 (preferably silicone treated).

and each layer is described in further detail below.

Referring again to FIG. 2, the peel-and-stick masonry flashing 42 further includes a hot melt adhesive layer 48 which is formulated for pressure activation and compatibility with the polymeric membrane or web 44 and the release sheet 52 adhered thereto. The adhesives described herein are particularly useful for peel-and-stick applications in building construction industry as such adhesives are readily pressure activated after the release paper is removed.

The adhesive is formulated so that, in case of fire, the coatings thereof will not contribute to smoke or accelerate flame spreading. The adhesive layer 48 includes an inorganic material, namely, an alkali-resistant fiber glass 50. This additive enhances the overall strength of the flashing system and provides multidirectional reinforcement. Alternative, to being doped with the fiber glass additive 50, the flashing may be strengthened using polymeric fiber fragments. Also, the fiber-doped adhesive layer is formulated to have sufficient tackiness so that a durable bond between the membrane and the rough and porous surface of the masonry block is experienced. The adhesive on the flashing permits lapping of the widths of flashing precluding the use of caulks and sealants at the lapped joints.

Incorporating by reference the Di Rado et al. patent, U.S. Pat. No. 5,106,447, the hot melt adhesive compositions of hot melt layer 56 may be prepared from 10 to 50 weight percent of a thermoplastic elastomer, namely, thermoplastic polybutene-1/ethylene copolymer containing from about 5.5 to about 10%; by weight ethylene (polybutylene); 20 to 50 percent of a tackifier; 15 to 50 percent of an amorphous diluent having a softening point greater than 90 degrees C.; and, 0 to 2 percent of a stabilizer.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of melt index, the applicable isotactic polybutylenes to be used in the present adhesive should exhibit a melt index in the range of from about 5 to 2000 dg/min and preferably from 400 to 700 dg/min. The latter melt flow values are determined by the method described in ASTM D1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins; (3) aliphatic petroleum hydrocarbon resins; and, (4) partially and fully hydrogenated hydrocarbon resins.

The polyterpene resins have a having a softening point, as determined by an ASTM method E28-58 T, of from about 80 degrees C. to 150 degrees C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-10, S-25, S-40, S-85, S-100, S-115, S-125 and S-135 resins as sold by Hercules Chemical.

The aliphatic petroleum hydrocarbon resins have a Ball and Ring softening point of from about 80 degrees C. to 160 degrees C., resulting from polymer-ization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation.

Examples of the partially and fully hydrogenated hydrocarbon resins are resins such as Resin H-130 from Eastman, Escorez 5000 series from Exxon, and Regalrez from Hercules. The amorphous diluents which are needed and present in the adhesive composition include (atactic) amorphous polypropylene or other similar high softening point (i.e. greater than 90 degrees C.), low crystalline diluent, (e.g. amorphous polyalpha-olefins). These diluents, are used at levels of 20 to 50% by weight, preferably about 20 to 25% by weight.

A suitable release paper is applied thereover. After a prescribed cure period, the release paper is removed and the flashing of this invention is applied to the surface of a concrete block. The application to the concrete block is at room temperature utilizing a hand-operated laminating roller to provide the pressure activation. A spring scale is then attached to the masonry flashing and a 65 lb. force is required to peel the flashing from the block. Repeating the test for SBS-modified, peel-and-stick flashing, a force of 27 lb. (max.) is required to peel the flashing from the block.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; penta-erythrityl tetrakis-3 (3,5-di-tert-butyl-4-hydroxyphenyl) propionate; 4,4'methylenbis(2, 6-tert-butyl-phenol); 4,4'-thiobis (6-tert-butyl-o-cresol); 2,6-di-tertbutylphenol; 6-(4-hydroxy-phenoxy)-2,4-bis(n-octyl-thio)-1,3,5-triazine; di-n-octadecyl 3, 5-di-tert-butyl-4-hydroxy-benzylphosphonate; 2-(n-octylthio)-ethyl 3,5-di-tert-butyl-4-hydroxybenzoate; and sorbitol hexa [3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.0%. Besides the glass fiber reinforcing agent mentioned above, other additives such as flow modifiers, pigments, dyestuffs, etc., which are conventionally added to hot melt adhesives for various end uses may also be incorporated in minor amounts into the formulations of the present invention.

Figure 4:
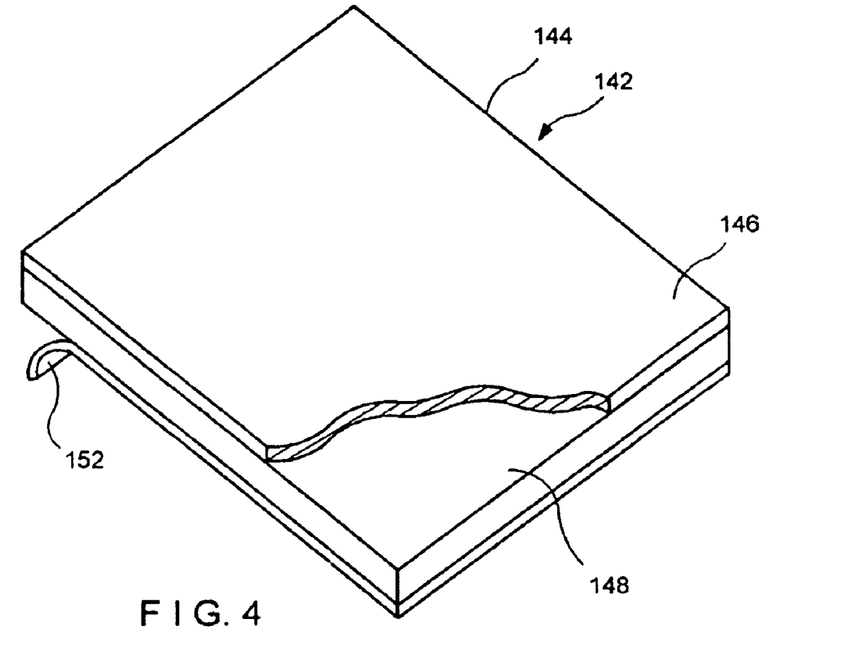
FIG. 4 is a perspective view of the uninstalled peel-and-stick flashing of the second embodiment wherein the flashing is formed from a layer of ethylene propylene diene terpolymer (EPDM) admixed with recycled rubber partially broken away to show details of the structure thereof.
Figure 5:
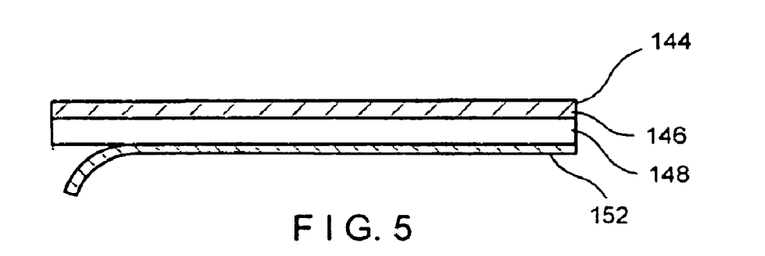
FIG. 5 is a cross-sectional view of the flashing membrane of FIG. 4.

Referring now to FIGS. 4 and 5, the second embodiment of this invention in which a surface-mounted peel-and-stick flashing, referred to generally by the reference designator 142, is shown. In this embodiment, similar parts to those of the membrane of the first embodiment are referred to by reference designators 100 units higher than a similar part in the first embodiment. Thus, for example, the adhesive layer 48 in the first embodiment has an analogous adhesive layer 148 in the second embodiment.

In showing the additional embodiments hereof, this specification details alternative structures of the polymeric membrane and the adhesive layer. Although shown as specific assemblages, any of the membranes shown and described may optionally be employed with any of the adhesive layers. Thus, the embodiments are only exemplary of the scope of the invention.

In this embodiment, another flashing membrane for surface-mounting in a cavity wall is shown. The flashing of the second embodiment has an ethylene propylene dienemethylene terpolymer-(EPDM) membrane 142. Here the EPDM membrane, a rubber-like polymer 144, is extruded with an extremely smooth surface exhibiting an excellent water-shedding property. Being rubber-like, the EPDM membrane 144 may be modified by the addition during extrusion of recycled rubber.

Consistent with the first embodiment, the flashing arrangement of the membrane 142 and also obviates the need for the customary drip plate; however, if desired one, preferably of stainless steel, may be employed. Similarly, this flashing membrane 142 functions cooperatively with weep holes and thereby permits any moisture or condensate to drain away from and out of the cavity and permits air and water vapor to enter into and exit from the cavity.

As in the prior embodiment, suitable thermoplastic polymers for the membrane are, for example, homo- and copolymers of ethylene, polyolefin, polypropylene, polystyrene, polyvinyl chloride, polyvinylidene chloride, polyvinyl alcohol, and ethylene/vinyl acetate copolymers. The most preferred materials are polyolefin, polypropylene and high density polyethylene.

Referring now to FIGS. 4 and 5 the laminar structure of the uninstalled peel-and-stick masonry flashing 142 is shown. The flashing 142, while provided as a surface-mounted flashing, is adaptable for through-wall mounting and utilizes the pressure-activated adhesive technology for application and extrusion lamination technology for construction. The structure consists of a three-layer arrangement. When viewing the uninstalled flashing 142 from the exposed surface and proceeding toward the mounted surface these layers are:

a. extruded membrane 144—ethylene propylene dienemethylene terpolymer with recycled rubber additive;

b. adhesive layer 148—an admixture of a hot-melt adhesive and a butylated adhesive 148; and,     c. release sheet 152 (preferably silicone treated).

and each layer is described in further detail below.

The adhesive layer 148 of the second embodiment is an admixture of a hot melt adhesive (adapted as described above for sufficient tack) and a butylated adhesive. The latter is present in the total mixture in the range of 5 to 40 percent. In the present case, a 75 percent hot melt adhesive and a 25 percent butylated adhesive mixture provided a non-drool adhesive layer 148 which, upon curing, has a melting point of 225° F. This aspect satisfied the stability requirement when the melting point was above 200° F.

Figure 6:
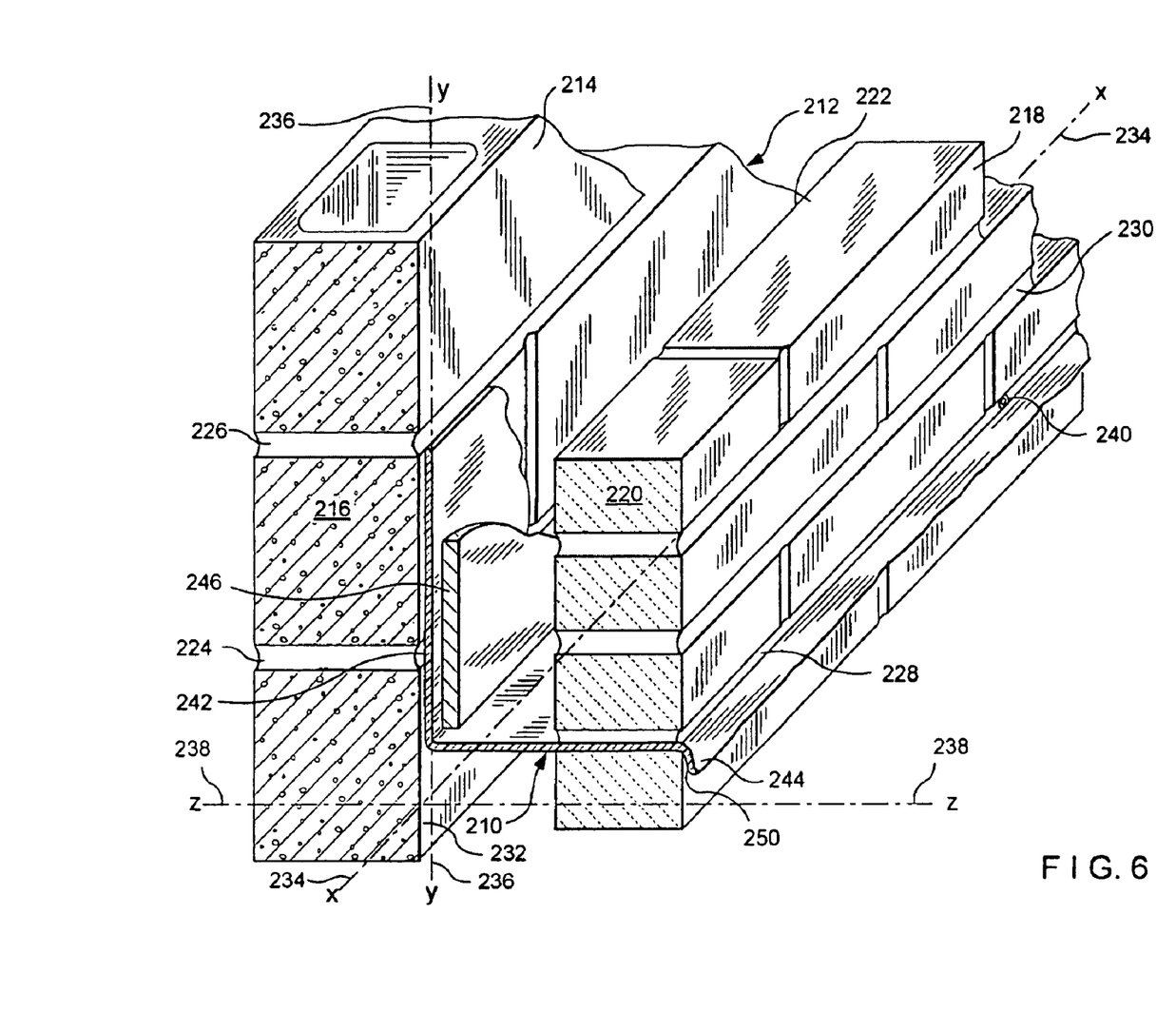
FIG. 6 is a perspective view of a third embodiment of a single-ply masonry flashing system of this invention wherein the flashing is a polyvinylchloride with an ethylene interpolymer and is shown in a similar installation as in FIG. 1, but having an integrated, formable drip edge extending beyond the outer wythe; and, FIG. 7 is a cross-sectional view of the flashing membrane of FIG. 6.
Figure 7:
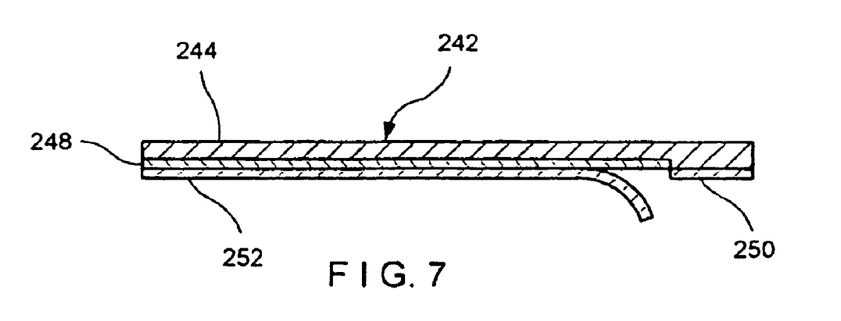

Referring now to FIGS. 6 and 7, the third embodiment of this invention in which a surface-mounted peel-and-stick single-ply flashing system a masonry flashing structure, referred to generally by the reference designator 210, is shown. In this embodiment, similar parts to those of the first embodiment are referred to by reference designators 200 units higher than a similar part in the first embodiment. Thus, for example, the adhesive layer 48 in the first embodiment has an analogous adhesive layer 248 in the third embodiment.

In this embodiment, a cavity wall structure 212 is shown having an inner wythe 214 of masonry blocks 216 and an outer wythe 218 of facing brick 220. Between the inner wythe 214 and the outer wythe 218, a cavity 222 is formed. Successive bed joints 224 and 226 are formed between courses of blocks 216 and the joints are substantially planar and horizontally disposed. Also, successive bed joints 228 and 230 are formed between courses of bricks 220 and the joints are substantially planar and horizontally disposed. For the surface-mounted flashing installation of this embodiment the flashing 210 is shown extending up to bed joint 226 of the inner wythe 214 and into bed joint 228 of the outer wythe 218.

For purposes of this discussion, the exterior surface 232 of the interior wythe 214 contains a horizontal line or x-axis 234 and an intersecting vertical line or y-axis 236. A horizontal line or z-axis 238 also passes through the coordinate origin formed by the intersecting x- and y-axes. In the discussion which follows, it will be seen that the masonry flashing system 210 of this invention is constructed to completely seal the cavity, to drain water therefrom and to permit air and water vapor to enter and exit through weep holes 240 that are in communication the masonry flashing 210.

Across the cavity 222, in this embodiment, a surface-mounting of the masonry flashing is shown. The flashing 210 includes a single-ply membrane 242 constructed for emplacement on surface 232 of interior wythe 214 in an x-y plane and for extending across cavity 222 through bed joint 228. The addition of a foil drip edge 250 renders the membrane 242 manually formable so that upon being turned downward the flashing retains the displaced position. The cavity 222, upon installation of the flashing, is sealed thereby. In this preferred mode, it is seen that the polymeric membrane 242 is installed behind insulation 244.

In the third embodiment, an alternative flashing membrane for surface mounting in a cavity wall is shown. The flashing of the third embodiment is a 40-mil. thick Elvaloy membrane. In this instance, an integral drop edge 250 is attached to either side of membrane 244. While the drip edge 250 hereof is a stainless steel foil laminated to the longitudinal margin of the membrane 244, any suitable water-shedding means such as a metallized selvage, a metal foil lamina, a plastic foil lamina or a heat-treated margin may be used. Among the metal foils for the water-shedding edging hereof are copper, aluminum, stainless steel, zinc, lead-coated copper, galvanized steel, and terne-coated and epoxy-coated metal foil. Similarly for metallizing the selvage copper, aluminum, steel, zinc and alloys thereof are suggested. It is noted that the edging may be applied to either surface of the membrane 244 to create the manually formable edge.

Referring now to FIGS. 6 and 7 the laminar structure of the uninstalled peel-and-stick masonry flashing 242 is shown. The flashing 242, while provided as a surface-mounted flashing, is adaptable for through-wall mounting and utilizes the pressure-activated adhesive technology for application and extrusion lamination technology for construction. The laminar structure consists of a five-layer arrangement. When viewing the uninstalled flashing 242 from the exposed surface and proceeding toward the mounted surface these layers are:
 a. single-ply 244—Elvaloy KEE membrane—40-mil thick;
 b. pressure-activated, hot-melt adhesive 248,
 c. metal-foil edging 250—stainless steel;
 d. foil adhesive—hot melt, (without tackifier of adhesive 248); and,
 e. release sheet 252 (preferably silicone treated).

The masonry flashing system of this invention exhibits temperature stability superior to that of bitumen materials and do not break down at high ambient temperatures. In addition, as hot melt adhesives are pressure activated, they set up immediately and reduce the time required for installation. Thus, the bonding of hot melt adhesives to masonry surfaces is immediate and unlike bitumen materials are not dependent on ambient temperatures for cure purposes. This translates into greater quality construction and easier assurance thereof. Another advantage of hot melt adhesives is their economy and applicability to peel-and-stick structures.

What is claimed is:

1. A peel-and-stick flashing deposited on a masonry cavity wall, said cavity wall having an inner wythe of masonry block and an outer wythe with weep holes therethrough, said peel-and-stick flashing comprising, in combination:
 a polymeric web having two major surfaces;
 a hot melt adhesive layer disposed on a major surface of said polymeric web, said hot melt adhesive adapted by having sufficient tack to durably adhere to the surface of said masonry block, said hot melt adhesive consisting principally of a thermoplastic elastomer, a tackifier resin and an amorphous diluent in proportions upon pressure activation thereof to provide the required adhesion; and,
 a release sheet disposed atop said hot melt adhesive layer, said release sheet being removable prior to activation of said peel-and-stick flashing.

2. A peel-and-stick flashing as described in claim 1, wherein said hot melt adhesive comprises about 10 to 50 percent by weight of a thermoplastic elastomer; about 5.5 to 10 percent by weight selected from a group consisting of ethylene, propylene, styrene, and mixtures thereof; about 20 to 50 percent of a tackifier resin; 15 to 50 percent by weight of an amorphous diluent; and, 0 to 2 percent by weight of a stabilizer.

3. A peel-and-stick flashing as described in claim 2 wherein said tackifier resin is selected from a group consisting of hydrogenated wood rosin, rosin ester, polyterpene resins, and aliphatic petroleum hydrocarbon resins.

4. A peel-and-stick flashing as described in claim 2 wherein said hot melt adhesive layer is clear and has a melting point, when cured, greater than 180 F.

5. A peel-and-stick flashing as described in claim 4 wherein said hot melt adhesive layer is doped with fibrous material thereby increasing the tensile strength of the overall construct.

6. A peel-and-stick flashing as described in claim 5 wherein said fibrous material is fiber glass.

7. A peel-and-stick flashing as described in claim 6 wherein said fibrous material is polymeric fiber fragments.

8. A peel-and-stick flashing as described in claim 1 wherein said thermoplastic elastomer is a mixture of polybutylene copolymers.

9. A peel-and-stick flashing as described in claim 8 wherein said polybutylene copolymers are polybutene and ethylene copolymer.

10. A peel-and-stick flashing deposited on a masonry cavity wall having an inner wythe of masonry block and an outer wythe with weep holes therethrough, said peel-and-stick flashing comprising in combination:
 a polymeric composite web having two major surfaces, said composite web selected from a group consisting of an extruded elastomeric, polyvinylchloride, polyolefin, polypropylene, high density polyethylene, a spun-bonded polyolefin, an ethylene propylene diene terpolymer, a polyvinylchloride with an ethylene interpolymer, an ethylene vinyl acetate carbon monoxide terpolymer, recycled rubber, an Elvaloy KEE extrusion, admixtures thereof, and other polymers and polymeric mixtures having similar properties;
 a hot melt adhesive layer disposed on a major surface of said polymeric web, said hot melt adhesive adapted by having sufficient tack to durably adhere to the surface of said masonry block, said hot melt adhesive consisting principally of an thermoplastic elastomer, a tackifier resin and an amorphous diluent in proportions to provide the required adhesion upon pressure activation thereof; and,
 a release sheet disposed atop said hot melt adhesive layer, said release sheet being removable prior to activation of said peel-and-stick flashing.

11. A peel-and-stick flashing as described in claim 10 wherein said polymeric composite web is ethylene propylene diene terpolymer admixed with recycled rubber.

12. A peel-and-stick flashing as described in claim 10 wherein said polymeric composite web is spun-bonded polyolefin and said hot melt adhesive layer is doped with polymeric fiber fragments.

13. A peel-and-stick flashing as described in claim 10 wherein said polymeric composite web is an Elvaloy KEE extrusion.

14. A peel-and-stick flashing as described in claim 13 wherein said polymeric composite web is adapted, upon installation, to be canted toward said weep holes enhancing fluid flow from said cavity and through said weep holes.

* * * * *